United States Patent
Prasad et al.

(10) Patent No.: US 10,712,969 B2
(45) Date of Patent: Jul. 14, 2020

(54) TRASH COMMANDS FOR STORAGE SYSTEMS

(71) Applicant: Oracle International Corporation, Redwood Shores, CA (US)

(72) Inventors: Shyam Babu Prasad, Bangalore (IN); Bhageerath Arasachetty, Mysore (IN); Praveen Kumar Jayaram, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 26 days.

(21) Appl. No.: 16/211,267

(22) Filed: Dec. 6, 2018

(65) Prior Publication Data
US 2020/0183607 A1 Jun. 11, 2020

(51) Int. Cl.
*G06F 3/06* (2006.01)
(52) U.S. Cl.
CPC .......... *G06F 3/0652* (2013.01); *G06F 3/0604* (2013.01); *G06F 3/0673* (2013.01)
(58) Field of Classification Search
CPC .... G06F 3/0652; G06F 3/0604; G06F 3/0673; G06F 3/04883; G06F 3/04842; G06F 3/03545; G06F 3/04817; G06F 3/0484; G06F 3/0488; G06F 3/0416; G06F 3/04886; G06F 3/0481; G06F 2203/04106
USPC ......................................................... 711/154
See application file for complete search history.

(56) References Cited

U.S. PATENT DOCUMENTS

| | | | |
|---|---|---|---|
| 7,444,593 B1 * | 10/2008 | Reid | G11B 27/034 345/537 |
| 9,286,307 B2 | 3/2016 | Maeda | |
| 10,372,931 B2 * | 8/2019 | Rotem | G06F 21/606 |
| 2004/0054733 A1 * | 3/2004 | Weeks | G06Q 10/107 709/206 |
| 2006/0242596 A1 * | 10/2006 | Armstrong | G06F 3/0482 715/786 |
| 2008/0301235 A1 * | 12/2008 | Mankiewicz | G06Q 10/107 709/206 |

(Continued)

OTHER PUBLICATIONS

Alfresco Enterprise 4.0.2, http://docs.alfresco.com/4.0/concepts/system-about.html, downloaded circa Jul. 25, 2018, pp. 1-3.

(Continued)

*Primary Examiner* — Mano Padmanabhan
*Assistant Examiner* — Jean C Edouard
(74) *Attorney, Agent, or Firm* — IPHorizons PLLC; Narendra Reddy Thappeta

(57) ABSTRACT

An aspect of the present disclosure provides for managing content items in a storage system. In an embodiment, a trash command is received from a user, where the trash command specifies an expression of a set of attribute conditions connected by logical operators. A set of content items having attributes matching said expression are selected, where the set of content items are stored in corresponding logical locations on the storage system prior to receiving the trash command. The selected set of content items are moved from respective logical locations on the storage system to a set of trash folders, wherein selecting and moving the set of content items are performed in response to receiving the trash command specifying the expression.

20 Claims, 13 Drawing Sheets

(56) References Cited

U.S. PATENT DOCUMENTS

| | | | | |
|---|---|---|---|---|
| 2014/0258901 | A1* | 9/2014 | Cho | G06F 3/04883 715/765 |
| 2015/0007053 | A1* | 1/2015 | Vitaldevara | G06Q 10/10 715/752 |
| 2015/0381735 | A1* | 12/2015 | Pascual | G06F 3/0484 715/753 |
| 2017/0031960 | A1* | 2/2017 | Takasu | G06F 3/0677 |
| 2017/0097789 | A1* | 4/2017 | Takasu | G06F 3/0604 |

OTHER PUBLICATIONS

Using Alfresco Share, http://docs.alfresco.com/4.0/topics/sh-uh-welcome.html, downloaded circa Jul. 25, 2018, pp. 1-4.
Content Deletion in Alfresco—More than Meets the Eye,http://www.tsgrp.com/2014/04/28/content-deletion-in-alfresco-more-than-meets-the-eye/, downloaded circa Jul. 25, 2016, pp. 1-7.
Alfresco Share—Organizing content, http://docs.alfresco.com/5.2/tasks/library-item-delete.html, downloaded circa Jul. 25, 2018, pp. 1-3.
Alfresco Share—Recovering deleted content, http://docs.alfresco.com/5.2/tasks/library-item-delete-retrieve.html, downloaded circa Jul. 25, 2018, pp. 1-3.
Alfresco Share—Emptying your trashcan, http://docs.alfresco.com/5.2/tasks/library-item-delete-final.html, downloaded circa Jul. 25, 2018, pp. 1-3.
OpenText Extended ECM for SAP Solutions, https://www.opentext.com/file_source/OpenText/en_US/PDF/OpenText_Extended_ECM_for_SAP_Solutions_10_-_eBook.pdf, date Feb. 2012, pp. 1-251.
Enterprise Content Management with Microsoft SharePoint: Content Control, https://www.microsoftpressstore.com/articles/article.aspx?p=2222452, downloaded circa Jul. 25, 2018, pp. 1-13.
Recovering Deleted Files from the SharePoint 2013 Recycle Bin, https://redmondmag.com/articles/2014/11/06/sharepoint-2013-recycle-bin.aspx, downloaded circa Jul. 25, 2018, pp. 1-12.
Nuxeo Platform User Documentation—User Guide for the Nuxeo Platform 5.6, https://doc.nuxeo.com/assets/main/archived-documentation/Nuxeo_Platform_5.6_UserGuide.pdf.
IBM FileNet Content Manager, https://www.ibm.com/in-en/marketplace/filenet-content-manager, downloaded circa Jul. 25, 2018, pp. 1-4.
Working with deleted files, https://www.ibm.com/developerworks/community/help/index.jsp?topic=%2Fcom.ibm.lotus.connections.communities.help%2Ft_com_library_restore_files.html, downloaded circa Jul. 25, 2018, pp. 1-1.
Content Management: CYA Technologies Announces ECM Recycle Bin Solution for EMC Documentum, https://www.ecmconnection.com/doc/content-management-cya-technologies-announces-0001, downloaded circa Jul. 25, 2018, pp. 1-3.
Sales force CRM Content Overview, https://help.salesforce.com/articleView?id=content_about.htm&type=5, downloaded circa Jul. 25, 2018, pp. 1-3.
Delete, Archive, and Restore Content, https://help.salesforce.com/articleView?id=content_delete.htm&type=5, downloaded circa Jul. 25, 2018, pp. 1-2.
Laserfiche Enterprise Content Management, https://www.laserfiche.com/products/laserfiche-ecm/, downloaded circa Jul. 25, 2018, pp. 1-2.
Recycle Bin,https://www.laserfiche.com/support/webhelp/Laserfiche/9.2/en-US/AdminGuide/LFAdmin.htm#Overview_Recycle_Bin.htm%3FTocPath%3DLaserfiche%2520Administration%2520Guide%7CRecycle%2520Bin%7C_____0, downloaded circa Jul. 25, 2018, pp. 1-1.
Del, https://docs.microsoft.com/en-us/windows-server/administration/windows-commands/del, date Oct. 16, 2017. pp. 1-4.

* cited by examiner

FIG. 4A

| | User Name | User Group |
|---|---|---|
| | 402 | 404 |
| 420 → | User 1 | G1 |
| 422 → | User 2 | G2 |
| 424 → | User 3 | G1 |
| 426 → | User 4 | G2 |

| | Item ID | Item Title | Version | Check In Date Time | Item Group | Author | Author Trash Flag Value | Access Privileges | Location |
|---|---|---|---|---|---|---|---|---|---|
| | 442 | 444 | 446 | 448 | 450 | 452 | 454 | 456 | 458 |
| 482 → | C101 | Product Invoice 1 | 1.0 | 10/11/2018 10:00 AM | Sales | User 1 | FALSE | Admin, G1 | ...\Sales\Folder1 |
| 484 → | C102 | Security Document 1 | 1.2 | 10/11/2018 11:00 AM | Security | User 2 | TRUE | Admin, G2 | ...\Security\Folder2 |
| 486 → | C103 | Product Invoice 2 | 2.0 | 10/12/2018 01:00 AM | Sales | User 3 | FALSE | Admin, G1, G2 | ...\Sales\Folder3 |
| 488 → | C104 | Product Manual 1 | 1.5 | 10/14/2018 01:00 PM | Sales | User 4 | TRUE | Admin, G1, G2 | ...\Sales\Folder4 |
| 490 → | C105 | Security Document 2 | 1.6 | 10/27/2018 11:00 AM | Security | User 3 | TRUE | Admin, G1, G2 | ...\Security\Folder5 |
| 492 → | C106 | Product Invoice 3 | 3.0 | 10/28/2018 11:00 AM | Sales | User 1 | FALSE | Admin, G1 | ...\Sales\Folder6 |
| 494 → | C107 | Product Manual 2 | 2.0 | 10/28/2018 11:00 AM | Sales | User 3 | FALSE | Admin, G1 | ...\Sales\Folder7 |

440 dItemTitle <contains> 'Product Invoice' <AND> dCheckinDate < '10/14/2018 12:00 AM' <AND> dGroup <matches> 'Sales'
<AND> TrashFlag = 'true'

- 502: dItemTitle <contains> 'Product Invoice'
- 504: <AND>
- 506: dCheckinDate < '10/14/2018 12:00 AM'
- 508: <AND>
- 510: dGroup <matches> 'Sales'
- 512: <AND>
- 514: TrashFlag = 'true'

FIG. 5A

530 — The following content items have been moved to trash:

| Item ID (442) | Item Title (444) | Version (446) | Check In Date Time (448) | Item Group (450) | Author (452) | Author Trash Flag Value (454) | Original Location (558) |
|---|---|---|---|---|---|---|---|
| C101 (←482) | Product Invoice 1 | 1.0 | 10/11/2018 10:00 AM | Sales | User 1 | FALSE | ...\Sales\Folder1 |
| C103 (←486) | Product Invoice 2 | 2.0 | 10/12/2018 01:00 AM | Sales | User 3 | FALSE | ...\Sales\Folder3 |

| Item ID | Item Title | Version | Check In Date Time | Item Group | Author | Author Trash Flag Value | Access Privileges | Location |
|---|---|---|---|---|---|---|---|---|
| C102 | Security Document 1 | 1.2 | 10/11/2018 11:00 AM | Security | User 2 | TRUE | Admin, G2 | ...\Security\Folder2 |
| C104 | Product Manual 1 | 1.5 | 10/14/2018 01:00 PM | Sales | User 4 | TRUE | Admin, G1, G2 | ...\Sales\Folder4 |
| C105 | Security Document 2 | 1.6 | 10/27/2018 11:00 AM | Security | User 3 | TRUE | Admin, G1, G2 | ...\Security\Folder5 |
| C106 | Product Invoice 3 | 3.0 | 10/28/2018 11:00 AM | Sales | User 1 | FALSE | Admin, G1 | ...\Sales\Folder6 |
| C107 | Product Manual 2 | 2.0 | 10/28/2018 11:00 AM | Sales | User 3 | FALSE | Admin, G1 | ...\Sales\Folder7 |

| Item ID | Item Title | Version | Check In Date Time | Item Group | Author | Original Location |
|---|---|---|---|---|---|---|
| C101 | Product Invoice 1 | 1.0 | 10/11/2018 10:00 AM | Sales | User 1 | ...\Sales\Folder1 |
| C103 | Product Invoice 2 | 2.0 | 10/12/2018 01:00 AM | Sales | User 3 | ...\Sales\Folder3 |

*FIG. 5D* dItemTitle <contains> 'Product Manual' <AND> dGroup <matches> 'Sales' <AND> TrashFlag = 'true'
- 602 : dItemTitle <contains> 'Product Manual'
- 604 : <AND>
- 606 : dGroup <matches> 'Sales'
- 608 : <AND>
- 610 : TrashFlag = 'true'

FIG. 6A

The following content items have been moved to trash:

| Item ID (442) | Item Title (444) | Version (446) | Check In Date Time (448) | Item Group (450) | Author (452) | Author Trash Flag Value (454) | Original Location (658) |
|---|---|---|---|---|---|---|---|
| C104 | Product Manual 1 | 1.5 | 10/14/2018 01:00 PM | Sales | User 4 | TRUE | ...\Sales\Folder4 |
| C107 | Product Manual 2 | 2.0 | 10/28/2018 11:00 AM | Sales | User 3 | FALSE | ...\Sales\Folder7 |

← 488 (C104 row)
← 494 (C107 row)

| Item ID | Item Title | Version | Check In Date Time | Item Group | Author | Author Trash Flag Value | Access Privileges | Location |
|---|---|---|---|---|---|---|---|---|
| C101 | Product Invoice 1 | 1.0 | 10/11/2018 10:00 AM | Sales | User 1 | FALSE | Admin, G1 | ...\Sales\Folder1 |
| C102 | Security Document 1 | 1.2 | 10/11/2018 11:00 AM | Security | User 2 | TRUE | Admin, G2 | ...\Security\Folder2 |
| C103 | Product Invoice 2 | 2.0 | 10/12/2018 01:00 AM | Sales | User 3 | FALSE | Admin, G1, G2 | ...\Sales\Folder3 |
| C105 | Security Document 2 | 1.6 | 10/27/2018 11:00 AM | Security | User 3 | TRUE | Admin, G1, G2 | ...\Security\Folder5 |
| C106 | Product Invoice 3 | 3.0 | 10/28/2018 11:00 AM | Sales | User 1 | FALSE | Admin, G1 | ...\Sales\Folder6 |

| Item ID 442 | Item Title 444 | Version 446 | Check In Date Time 448 | Item Group 450 | Author 452 | Original Location 658 |
|---|---|---|---|---|---|---|
| C107 | Product Manual 2 | 2.0 | 10/28/2018 11:00 AM | Sales | User 3 | ...\Sales\Folder7 |

| Item ID 442 | Item Title 444 | Version 446 | Check In Date Time 448 | Item Group 450 | Author 452 | Original Location 668 |
|---|---|---|---|---|---|---|
| C104 | Product Manual 1 | 1.0 | 10/14/2018 01:00 PM | Sales | User 4 | ...\Sales\Folder4 | dItemTitle <contains> 'Security Document' <AND> dGroup <matches> 'Security' <AND> TrashFlag = 'true'
       _____702_____/      _____704_____/       _____706_____/  _____708_____/  \__710__/

FIG. 7A

The following content items have been moved to trash:

| Item ID | Item Title | Version | Check In Date Time | Item Group | Author | Author Trash Flag Value | Original Location |
|---|---|---|---|---|---|---|---|
| 442 | 444 | 446 | 448 | 450 | 452 | 454 | 758 |
| C105 | Security Document 2 | 1.6 | 10/27/2018 11:00 AM | Security | User 3 | TRUE | ...\Security\Folder5 |

← 490

User does not have access privileges to move the following items to trash:

| Item ID | Item Title | Version | Check In Date Time | Item Group | Author | Author Trash Flag Value | Location |
|---|---|---|---|---|---|---|---|
| 442 | 444 | 446 | 448 | 450 | 452 | 454 | 458 |
| C102 | Security Document 1 | 1.2 | 10/11/2018 11:00 AM | Security | User 2 | TRUE | ...\Security\Folder2 |

| Item ID | Item Title | Version | Check In Date Time | Item Group | Author | Author Trash Flag Value | Access Privileges | Location |
|---|---|---|---|---|---|---|---|---|
| C101 | Product Invoice 1 | 1.0 | 10/11/2018 10:00 AM | Sales | User 1 | FALSE | Admin, G1 | ...\Sales\Folder1 |
| C102 | Security Document 1 | 1.2 | 10/11/2018 11:00 AM | Security | User 2 | TRUE | Admin, G2 | ...\Security\Folder2 |
| C103 | Product Invoice 2 | 2.0 | 10/12/2018 01:00 AM | Sales | User 3 | FALSE | Admin, G1, G2 | ...\Sales\Folder3 |
| C104 | Product Manual 1 | 1.5 | 10/14/2018 01:00 PM | Sales | User 4 | TRUE | Admin, G1, G2 | ...\Sales\Folder4 |
| C106 | Product Invoice 3 | 3.0 | 10/28/2018 11:00 AM | Sales | User 1 | FALSE | Admin, G1 | ...\Sales\Folder6 |
| C107 | Product Manual 2 | 2.0 | 10/28/2018 11:00 AM | Sales | User 3 | FALSE | Admin, G1 | ...\Sales\Folder7 |

| Item ID | Item Title | Version | Check In Date Time | Item Group | Author | Original Location |
|---|---|---|---|---|---|---|
| C105 | Security Document 2 | 1.6 | 10/27/2018 11:00 AM | Security | User 3 | ...\Security\Folder5 |

*FIG. 7D*

TRASH COMMANDS FOR STORAGE SYSTEMS

BACKGROUND OF THE DISCLOSURE

Technical Field

The present disclosure relates to managing content items in storage systems, and more specifically to trash commands implemented associated with such storage systems.

Related Art

A content item contains electronic data, and is typically operable with operations such as create, read, update, and delete, as is well known in the relevant arts. Content items are referred to as files also in certain contexts such as file systems.

Storage systems are used for storing content items. A storage system typically contains non-volatile memory for storing the data representing the content items, and management applications which enables users to use user-understandable commands such as create, open, delete, modify, etc. The management applications are presented in the form of file management systems, content management systems, etc.

Thus, each content item has the content data stored in physical locations (e.g., sectors in case of hard disk drives) on non-volatile memory, while the management applications present the content items in corresponding logical locations in the context of folders/directories, etc., as is also well known in the relevant arts.

Trash commands are often supported associated with storage systems. A trash command operates to move content items to pre-specified logical location (e.g., trash folder) on the storage system, with the user being provided the option of later restoring the content items back to the corresponding original logical location.

Aspects of the present disclosure relate to trash commands in storage systems.

BRIEF DESCRIPTION OF THE DRAWINGS

Example embodiments of the present disclosure will be described with reference to the accompanying drawings briefly described below.

FIGS. 4A-4B depict portions of management data maintained by a content management system, prior to issuance of illustrative trash commands, in one embodiment.

FIGS. 5A-5D together illustrate an example operation of a trash command in storage systems in one embodiment.

FIGS. 6A-6E together illustrate another example operation of a trash command in storage systems in one embodiment.

FIG. 7A-7D together illustrate yet another example operation of a trash command in storage systems in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
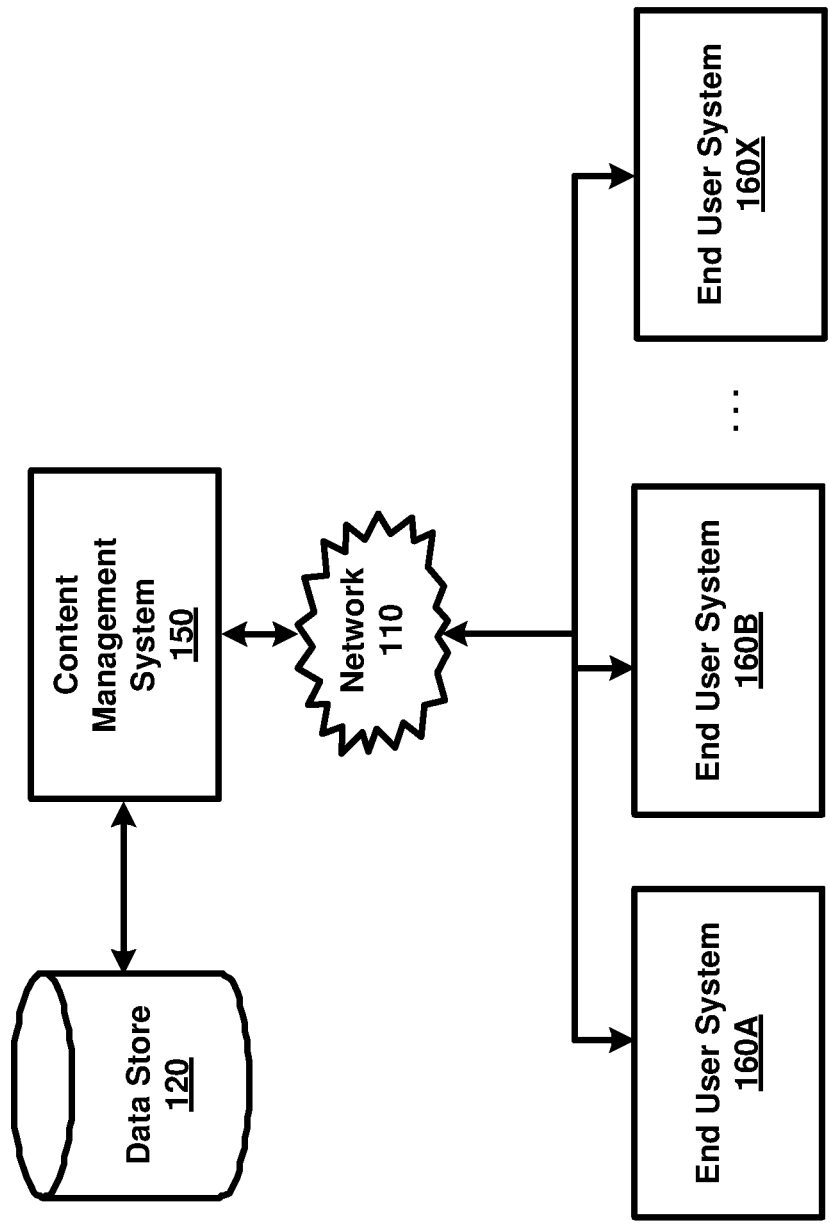
FIG. 1 is a block diagram illustrating an example environment in which several aspects of the present disclosure can be implemented.

An aspect of the present disclosure provides for managing content items in a storage system. In an embodiment, a trash command is received from a user, where the trash command specifies an expression of a set of attribute conditions connected by logical operators. A set of content items having attributes matching the expression are selected. The selected set of content items are moved from respective logical locations on the storage system to a set of trash folders, wherein selecting and moving the set of content items are performed in response to receiving the trash command specifying the expression.

According to another aspect, respective attribute instances associated with each content item are maintained, wherein each attribute instance comprises a name-value pair, with the name uniquely identifying the corresponding attribute and the value specifying a characteristic of the content item in relation to the identified attribute, wherein each attribute condition specifies a condition required to be satisfied by a corresponding attribute, wherein the selecting comprises checking whether the attribute instances of each content item together satisfy the expression, wherein the content item is included in the set of content items only if attribute instances of the content item satisfy the expression, wherein the selecting and moving are performed in response to receiving of the trash command specifying the expression without requiring any further user inputs after receipt of the trash command.

In an embodiment, a trash flag capable of being set to a first value or a second value is received, wherein the trash command is deemed to be received only when the trash flag is set to the first value, and if the trash flag is set to the second value, the set of content items having attributes matching the expression are sent for display.

In another embodiment, the set of trash folders include a personal trash folder of the user and respective personal trash folders of authors of the set of content items. An author flag is associated with each of the set of content items, wherein the author flag is capable of being set to a third value or a fourth value. Each content item of the set of content items is moved to the personal trash folder of the user if a corresponding author trash flag is set to the third value, and to personal trash folder of the author of the content item if the corresponding author trash flag is set to the fourth value.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment in which several aspects of the present disclosure can be implemented. The block diagram is shown containing network 110, data store 120, content management system (CMS) 150 and end user systems 160A-160X.

Merely for illustration, only representative number/type of blocks is shown in FIG. 1. Many environments often contain many more blocks, both in number and type, depending on the purpose for which the environment is designed. Also, the environment of FIG. 1 is shown containing CMS 150 only for illustration and instead may contain other similar systems such as file management systems. Each block of FIG. 1 is described below in further detail.

Network 110 represents a data network providing connectivity between CMS 150 and end user systems 160A-160X. Network 110 may be an internet (including the world-wide connected Internet), a combination of internet and intranet, etc. Network 110 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by network 110. When the packet contains content such as port numbers, which specifies a target application, the packet may be said to be directed to such application as well.

Data store 120 represents a non-volatile (persistent) storage for storing data representing content items. While data store 120 is shown external to content management system 150, it should be appreciated that part or whole of the data store may be integrated within content management system 150.

Each of end user systems 160A-160X represents a system such as a personal computer, workstation, mobile device, computing tablet etc., used by end users to generate (user) commands directed to CMS 150. The commands may be generated using appropriate user interfaces (e.g., web pages provided by an application executing in the server, a native user interface provided by a portion of an application downloaded from the server, etc.). In general, an end user system sends a command and may receive the corresponding responses (e.g., web pages) containing the results of execution of the commands. The web pages/responses may then be presented to the user at end user system 160 by client applications such as the browser.

CMS 150, in combination with data store 120, operates as a storage system in which users can manage (create, store, and access/share) content items. CMS 150 may be integrated with appropriate DBMS (database management system) software to facilitate the content items to be managed using appropriate SQL commands. In respect of operation as a content management system, a user may check-in a content item, causing the content item to be stored in the repository (data store 120). The users may be able to check-in the content item as either a new item or an updated version of an item already existing in the repository.

CMS 150 also enables users to control access to the content items (in addition to check-in), i.e., check-out the content items, delete the content items and trash the content items. Check-out of a content item implies a user obtaining exclusive update privileges for that checked out content item. Such exclusive update privileges imply that other users are blocked from checking-in updated versions of that checked-out content item typically until the user checks-in the content item or an updated version thereof. Thus, sharing of a content item is dependent on check-in and check-out of the content item.

Deletion of a content item implies removal of content items from at least the logical location of data store 120, and typically from the physical location as well. Trashing of a content item implies moving the content item to a pre-specified logical location (e.g., trash folder) on data store 120, with the user being provided the option of later restoring the content item back to the corresponding original logical location. A trash folder can be a common trash folder for multiple users wherein the common trash folder contains the content items trashed by multiple users. Alternatively or in addition, dedicated/separate personal trash folders can be maintained for each user. CMS 150 can be implemented in a server system, such as a web/application server.

CMS 150 presents content items stored in data store 120 in corresponding logical locations such as folders/directories, etc. CMS 150 performs the tasks/operations of check-in, check-out, delete, trash etc., in response to user requests/commands for such operations. Though CMS 150 is shown performing trash operation only on the content items stored in data store 120, CMS 150 may also perform trash operation on internal content items (such as content items stored in a non-volatile storage/hard disk within the server system). Upon completion of the tasks/operations in response to the user requests/commands, CMS 150 may send the result of performance of the operations to the requesting end user system (one of 160A-160X). The results may be presented in appropriate user interfaces (e.g., using web pages) for displaying the results to the requesting user.

Aspects of the present disclosure relate to trash operations, as described below with examples.

3. Trash Operations

Figure 2:
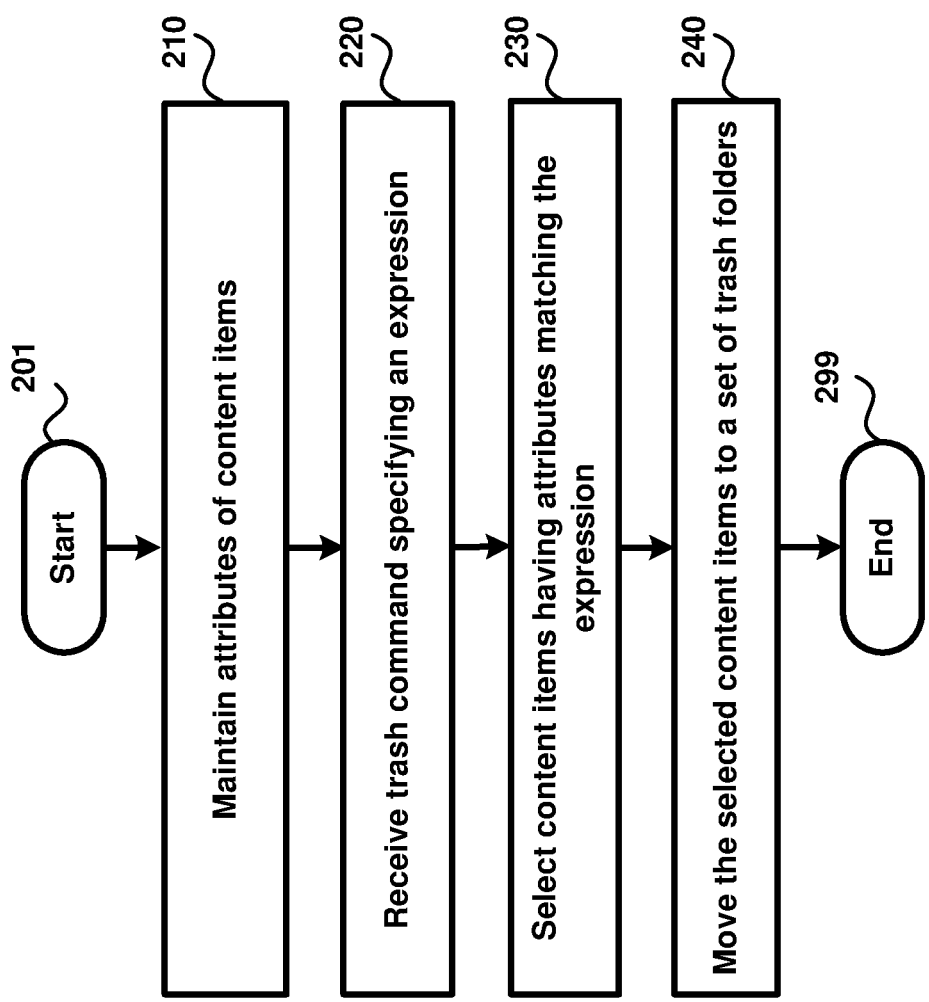
FIG. 2 is a flow chart illustrating the manner in which trash operation is performed on content items is storage systems according to an aspect of the present disclosure.

FIG. 2 is a flow chart illustrating the manner in which trash operation is performed on content items stored in a storage medium/repository according to an aspect of the present disclosure. The flowchart is described with respect to CMS 150 of FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, CMS 150 maintains attributes of content items. The attributes provide for recording of relevant features of the content items such as name of the content item, location, time of creation and modification, author, access privileges, etc. Each maintained attribute may be viewed as an attribute instance in the form of a name-value pair. The attribute name uniquely identifies the corresponding attribute and the value specifies a characteristic of the content item in relation to the identified attribute. The value can be any kind of data, numeric or otherwise, and may take a range of numbers whether continuous or discontinuous. For example, if "xyz" is an author of a content item, then "author" is the name of the attribute instance and "xyz" is the value of the attribute instance "author". Attributes may also be stored along with content items in data store 120, even though a separate storage can be used for storage, according to the design of CMS 150.

In step 220, CMS 150 receives a trash command specifying an expression. An expression is a set of (one or more) attribute conditions connected by logical operators. Each attribute condition specifies a condition associated with a corresponding attribute. A logical operator (such as AND, OR, NOT etc.) specifies the relationship between attribute conditions. The trash command specifying the expression may be provided at end user system 160 by a user through any suitable user interface.

In step 230, CMS 150 selects content items having attributes matching the expression. CMS 150 may select the content items by examining the attribute instances of step 210. CMS 150 selects the content items by checking whether the attribute instances of each content item together satisfy the expression. For evaluating match of some attribute conditions (e.g., specific text being present in the content of a content item), CMS 150 may also examine the content of content items. A content item is selected only if the attribute instances of the content item satisfy the expression.

In step 240, CMS 150 moves the selected content items to a set of (one or more) trash folders. Specifically, all the selected items can be moved to a single trash folder or multiple trash folders, as illustrated below with examples. In general, the content items moved to a trash folder may be restored (moved back) to the original logical location (folder in case of CMS). The flowchart ends in step 299.

In an embodiment, the selected content items are moved directly in response to receiving the trash command specifying the expression from the user, that is, without any further manual intervention between receiving of the trash command specifying the expression and the moving of the selected content items to the set of trash folders. Such a feature is contrasted with an alternative implementation in which after selecting the content items matching the expression, CMS 150 may display the list of selected content items to the user and may move the selected content items only upon receiving a further input (confirmation) from the user.

The manner in which CMS 150 facilitates the trash operation on content items according to FIG. 2 is illustrated below with examples.

4. Example User Interface

Figure 3A:
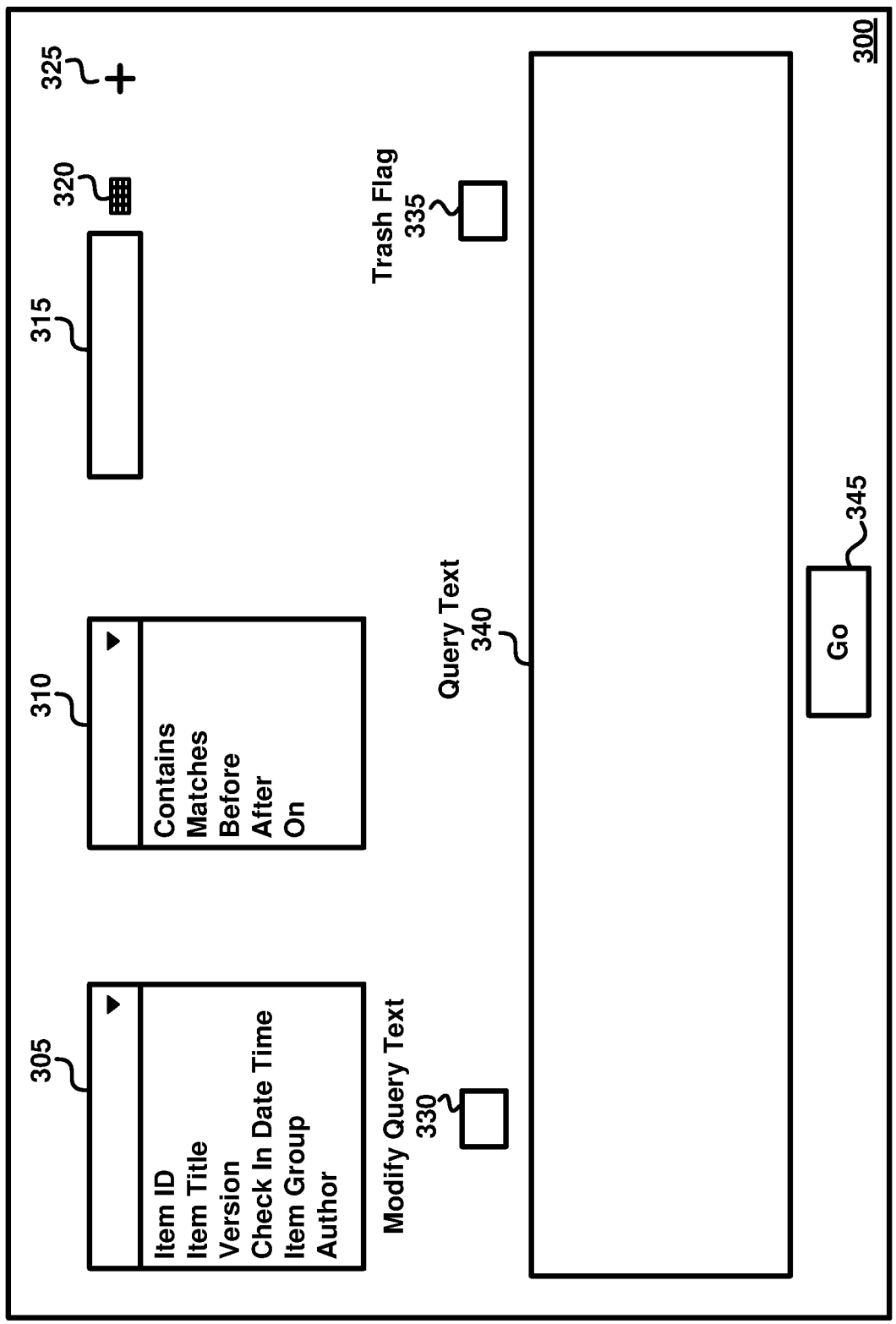
FIGS. 3A-3B depict a user interface at respective time instances for receiving trash commands specifying expressions in one embodiment.
Figure 3B:
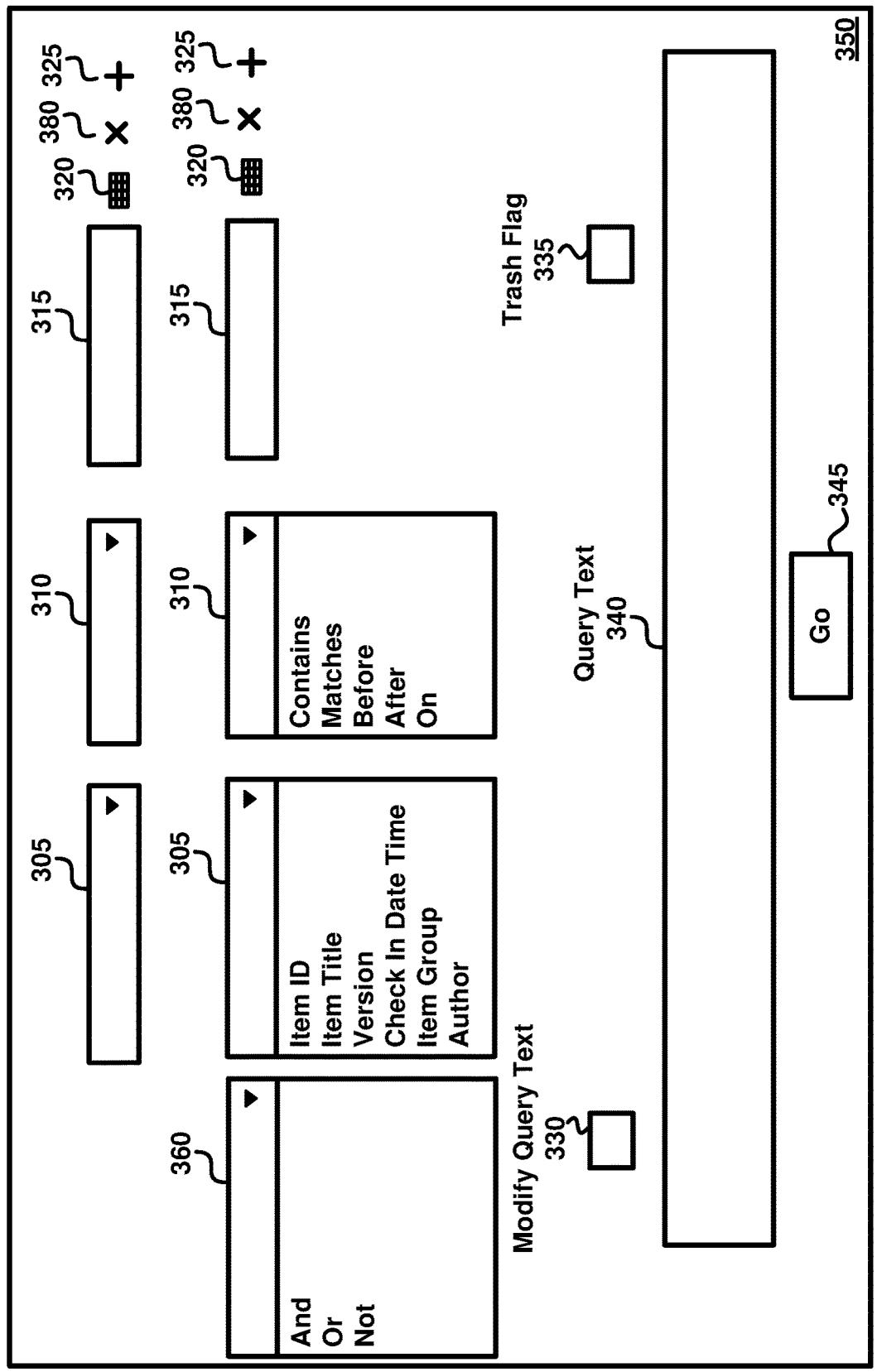

FIGS. 3A and 3B depict an example user interface at respective time instances, using which a user may issue trash commands specifying expressions, in one embodiment. Display areas 300 and 350 represent a portion of a user interface displayed on a display unit (shown below) associated with one of end user systems 160A-160X. In one embodiment, display areas 300 and 350 are portions of a web page rendered at corresponding time instances by a browser executing on end user system 160. Web pages are provided by CMS 150 in response to a user sending appropriate requests (for example, by specifying corresponding URLs in the address bar) using the browser, and further updated as the attribute conditions continue to be specified, as described below.

FIG. 3A depicts a sample content management user interface 300 for receiving a trash command specifying an expression from the user in one embodiment. Display area 305 depicts a list of selectable attributes of content items as a drop-down menu (that appears when clicked on the down arrow) from which the user can specify an attribute by appropriate selections. The drop-down menu is shown containing the attributes "Item ID", "Item Title", "Version", "Check-in Date Time", "Item Group" and "Author". Furthermore, though not shown, the drop-down menu may also contain additional selectable attributes such as "Full content" etc.

Display area 310 depicts a list of selectable comparators as a drop-down menu which compare the attribute specified in display area 305 with the value of the attribute to be specified in display area 315. The drop-down menu under display area 310 is shown containing the comparators "Contains", "Matches", "Before", "After" and "On", from which the user can specify a comparator by appropriate selections. In an example embodiment, the list of comparators shown under the drop-down menu of display area 310 may depend on the attribute specified in display area 305. For example, if the user specifies the attribute "Check-in Date Time" in display area 305, then the drop-down menu under display area 310 may show only "Before", "After" and "On" as the comparators.

Display area 315 facilitates the user to specify a value corresponding to the attribute selected in display area 305. In an example embodiment, the value that can be specified in display area 315 may depend on the specifications made in display areas 305 and 310. For example, if the attribute specified in display area 305 is "Check-in Date Time" and the comparator specified in display area 310 is "After", the user may be allowed to specify only date and time in the prescribed format as the corresponding value in display area 315. The user may select the desired date and time from calendar 320 and the selected date and time gets populated in display area 315.

As may be readily appreciated, the comparator "After" specified in display area 310 compares the attribute "Check-in Date Time" specified in display area 305 with the value (i.e., date and time) specified in display area 315. Thus, attribute conditions can be specified using the display areas 305, 310 and 315.

Add symbol 325, when selected, facilitates the user to specify additional attribute conditions by providing additional rows of display units 305, 310 and 315, as explained in detail with respect to FIG. 3B.

Display area 300 of FIG. 3A gets updated as display area 350 of FIG. 3B when add symbol 325 is selected. As may be readily observed, display area 350 is shown containing a second row of display areas 305, 310 and 315. The second row of display areas 305, 310 and 315 facilitate the user to specify a second attribute condition. Display area 360 depicts a list of selectable logical operators as a drop-down menu, from which the user can specify a logical operator by appropriate selections. The logical operator specified in display area 360 specifies the relation between the first attribute condition and the second attribute condition. For example, if the user wants to select the content items created after 10:00 AM, Oct. 13, 2018 and containing the phrase "Product Invoice" in the Title, then the user may specify the first attribute condition by specifying "Check-in Date Time", "After" and "10/13/2018 10:00 AM" in the first row of display areas 305, 310 and 315 respectively, specify "AND" as the logical operator in display area 360, and specify the second attribute condition by specifying "Item Title", "Containing" and "Product Invoice" in the second row of display areas 305, 310 and 315 respectively.

Cancel symbol 380 in FIG. 3B can be selected for cancellation/deletion of the corresponding row of display units (and thus the cancellation of corresponding attribute condition).

Query text 340 depicts the expression generated by CMS 150 in the form of a query, based on the attribute conditions and logical operators specified by the user.

Modify query text 330, when selected, facilitates the user to modify the text of the query displayed in query text 340.

Trash flag 335, when set (i.e., when the value is "true"), indicates that the content items satisfying the expression ought to be trashed. In an example embodiment, when trash flag 335 is set, CMS 150 generates a query indicating that the trash flag is set and appends it (for example, using logical operator 'AND') to the query corresponding to the expression. The resultant query may also be displayed in query text 340.

Go button 345, when selected/clicked, submits the query in query text 340 to CMS 150. CMS 150 examines the query and determines whether the query indicates that trash flag 335 is set. If the query indicates that trash flag 335 is set, CMS 150 deems the query as the trash command, selects the content items having attributes matching the expression and moves the selected content items to trash folders. The selection and moving of the content items are done without any further human intervention after receipt of the query (trash command) by CMS 150. The details of the content items that are moved and/or not moved (due to lack of access privileges) to trash folders may be displayed on the display at end user system 160.

If CMS 150 determines that the query received does not indicate that trash flag 335 is set, CMS 150 selects the content items having attributes matching the expression and causes the list of the selected content items to be displayed on the display at end user system 160.

It may be appreciated that FIGS. 3A and 3B depict only sample user interfaces and any other user interfaces may be used for receiving the trash command/expression/attributes conditions.

In an alternative implementation, trash flag 335 may not be present and selecting/clicking on go button 345 is deemed as issuing the trash command. In such implementation, go button 345, when selected, submits the query (corresponding to expression) in query text 340 to CMS 150. CMS 150 then selects the content items having attributes matching the expression and moves the selected content items to trash folders, without any further manual intervention after receipt of the query.

CMS 150 may select the content items having attributes matching the expression by examining/parsing the management data maintained by CMS 150. Management data refers to the attribute instances corresponding to the content items and the users, maintained in the form of metadata. Management data may include metadata of the content items (attribute data), metadata of the users such as details of the users and classification of the users, etc., (user management data) and the metadata of the content items in the personal trash folder of each user (personal trash folder data).

Description is continued below with respect to example management data maintained by CMS 150.

5. Example Management Data

FIGS. 4A and 4B depict portions of management data maintained by the content management system (prior to issuance of queries by users), in one embodiment. CMS 150 may maintain the management data in data store 120 or in any other storage. Management data can be stored in the form of tables. However, in alternative embodiments, the management data may be maintained according to other data formats (such as files according to extensible markup language (XML), etc.) and/or using other data structures (such as lists, trees, etc.), as will be apparent to one skilled in the relevant arts by reading the disclosure herein.

FIG. 4A depicts table 400 containing user management data. Column 402 ("User Name") specifies the name of each of the user stored in the corresponding row, column 404 ("User Group") specifies the user group/classification to which the user belongs to. Thus row 420 specifies the details of a user with the name "User 1" (column 402) and belonging to user group "G1" (column 404). Similarly, the other rows of table 400 specify the details of other users. Though not shown, user management data may also contain additional details such as user ID, login credentials etc. The user name and the user group may be relevant in determining the access privileges of the users. Access privileges refer to permission(s) to perform a set of tasks/operations (including trash operation).

FIG. 4B depicts table 440 containing attribute data. Table 440 maintains attributes of the content items in respective rows. Each row represents an attribute instance in the form of a name-value pair. Each column represents an attribute and each row represents corresponding value of the attribute. Column 442 ("Item ID") specifies a unique identifier for each content item stored in the corresponding row, column 444 ("Item Title") specifies a corresponding item title/name, column 446 ("Version") specifies a version of the content item, column 448 ("Check In Date Time") specifies the date and time the content item is checked-in into the CMS 150, column 450 ("Item Group") specifies to the item group to which the content item belongs to, column 452 ("Author") refers to the author of the content item. Column 454 ("Author Trash Flag Value") specifies whether author trash flag associated with the content item is set or not. The author trash flag is said to be set if the author trash flag value is "true" and not set if the author trash flag value is "false". Author trash flag, when set, implies that the corresponding content item is to be moved to author's personal trash folder upon operation of trash command on the content item. When the flag is not set, the content item is instead specified to be moved to the personal trash folder of the user executing the trash command. Author trash flag may be set while checking-in the content item into CMS 150 or later also. Column 456 ("Access Privileges") specifies the users/user groups who can trash the content item. Column 458 ("Location") specifies the logical location of the content item on repository i.e., the details of the folder/directory containing the content item.

Thus, row 482 specifies the details of the content items having the Item ID "C101" (column 442), with title "Product Invoice 1" (column 444), version "1.0" (column 446), check-in date time "10/11/2018 10:00 AM" (column 448), item group "Sales" (column 450), author "User 1" (column 452), author trash flag value set as "false" (column 454), access privileges as "Admin, G1" (column 456), and the location as " . . . \Sales\Folder1". Similarly, the other rows of table 440 specify the details of other content items maintained by CMS 150.

In response to receiving a trash command specifying an expression (in the form of a query) from a user, CMS 150 examines/parses the user management data in table 400 of FIG. 4A and determines the user group (column 404) of the user. CMS 150 then checks whether the attribute instances of each content item in table 440 of FIG. 4B together satisfy the expression and selects the set of content items to be trashed. A content item is selected if the attribute instances of the content item satisfies the expression. In an example embodiment, CMS 150 also checks whether the user has the access privileges (column 456) to trash each of the selected set of content items and removes the content items for which the user does not have access privileges. For each of the selected content items, CMS 150 examines the corresponding author trash flag value and determines whether the corresponding author trash flag is set ("true") or not ("false"). If the corresponding author flag is set, CMS 150 moves the content item to the personal trash folder of the author (author is determined from column 452) of the content item. If the corresponding author flag is not set, CMS 150 moves the content item to the personal trash folder of the user who has issued the trash command. It should be further appreciated that some of the attributes (e.g., specific text being present in the content of an item) may not be a priori maintained by CMS 150 in table 440. In such cases, CMS 150 may also examine the content of the content items (at location 458) to determine the content items having attributes matching the expression. Upon completion of the execution of the trash command, CMS 150 may display a response containing the results of the execution of the trash command and may also update the management data.

Description is continued below with respect to examples illustrating trash operations on content items in storage systems.

5. Examples Illustrating Trash Operations

FIGS. 5A-5D together illustrate an example operation of a trash command on content items in storage systems. FIG. 5A depicts a query generated and displayed in query text 340 by CMS 150 based on the specifications made by user 1 through the user interfaces of FIGS. 3A and 3B from end user system 160. The query of FIG. 5A is shown containing portions 502, 504, 506, 508, 510, 512 and 514. Portions 502, 506 and 510 correspond to the first, second and third attribute conditions respectively. Portion 514 depicts trash flag as being set. Portions 504, 508 and 512 correspond to logical operators. In section 502, "dItemTitle" corresponds to the name of the attribute, "<contains>" corresponds to the comparator and "'Product Invoice'" corresponds to the value of the attribute instance. Similarly, each of portions 506 and 510 also contains name of the attribute, comparator and value of the attribute. In the instant query, 'AND' is the logical operator in all three portions 504, 508 and 512 indicating that all the three attribute conditions need to be satisfied.

When user 1 clicks on go button 345, CMS 150 receives the query of FIG. 5A. Upon receipt of query, CMS 150 examines the query and determines that trash flag 335 is set, and deems the query as a trash command. After determining the query as a trash command, CMS 150 examines the user management data in table 400 of FIG. 4A and determines that G1 is the corresponding user group of user 1. CMS 150 then examines the attribute data in table 440 of FIG. 4B and selects content items C101 and C103 (i.e., rows 482 and 486 of FIG. 4B respectively) as the content items having attributes matching the expression. CMS 150 then checks column 456 corresponding to rows 482 and 486 and determines that user 1 has the access privileges to trash both the selected content items C101 and C103. Then, CMS 150 examines the corresponding author trash flag value for content items C101 and C103 and determines that the corresponding author trash flags are not set for both content items C101 and C103. As the corresponding author flags are not set, CMS 150 moves both content items C101 and C103 to the personal trash folder of user 1 (i.e., user who has issued the trash command). Upon completion of the execution of the trash command (i.e., upon completion of trash operation), CMS 150 displays a response (in the form of a user interface) containing the results of the execution of the trash command (as shown in FIG. 5B) and also updates the attribute data of FIG. 4B (as shown in FIG. 5C) and the personal trash folder data of user 1 (as shown in FIG. 5D).

FIG. 5B depicts a sample response 530 displayed by CMS 150, containing the results of the execution of the trash command, in one embodiment. Response 530 provides the details of the content items (C101 and C103) that have been moved to the trash folder. Columns 442, 444, 446, 448, 450, 452 and 454, and rows 482 and 486 of FIG. 5B correspond to the respective columns and rows of table 440 of FIG. 4B. Column 558 of user interface 530 indicates the original locations (i.e., locations prior to moving to trash folders) of the content items that have been moved to the trash folder. As may be readily appreciated, the locations in column 558 correspond to respective locations in column 458 of FIG. 4B.

FIG. 5C depicts the status of the attribute data of FIG. 4B after the completion of the execution of the trash command. As may be readily appreciated, the entries corresponding to content items C101 and C103 (i.e., rows 482 and 486 of FIG. 4B) that have been moved to the personal trash folder of user 1 are not present in FIG. 5C.

FIG. 5D depicts the personal trash folder data of user 1 (i.e., the user who has issued the search command). As may be readily appreciated, both content items C101 and C103 have been moved to the personal trash folder of user 1 as "Author Trash Flag Value" is "false" for both the content items. User 1 or the administrator may be facilitated with various options such as restoring the content items back to the corresponding original locations, deleting the content items permanently from the physical locations of data store 120 etc. In an example embodiment, when a content item in the personal trash folder is selected, CMS 150 provides a list of options such as "restore", "delete" etc. User 1 or the administrator can restore the content item back to its original location by selecting the option "restore".

FIGS. 6A-6E together illustrate another example operation of a trash command on content items in storage systems. FIG. 6A depicts a query generated and displayed in query text 340 by CMS 150 based on the specifications made by user 1 through the user interfaces of FIGS. 3A and 3B from end user system 160. The query of FIG. 6A is shown containing portions 602, 604, 606, 608 and 610. Portions 602 and 606 correspond to the first and second attribute conditions respectively. Portion 610 depicts trash flag as being set. Portions 604 and 608 correspond to the logical operators.

When user 1 clicks on go button 345, CMS 150 receives the query of FIG. 6A and deems the query as a trash command after determining that trash flag 335 is set. Upon determining that a trash command is received, CMS 150 examines/parses the user management data in table 400 of FIG. 4A and determines that G1 is the corresponding user group of user 1. CMS 150 then examines the attribute data in table 440 of FIG. 4B and selects content items C104 and C107 (i.e., rows 488 and 494 of FIG. 4B respectively) as the content items having attributes matching the expression. CMS 150 then checks column 456 corresponding to rows 488 and 494 and determines that user 1 has the access privileges to trash both the content items C104 and C107. Then, CMS 150 examines the corresponding author trash flag value for C104 and C107 and determines that the corresponding author trash flag is set for C104 and not set for C107. As the corresponding author flag is set for C104, CMS 150 moves content item C104 to the personal trash folder of user 4 (author of C104) and as the corresponding author flag is not set for C107, CMS 150 moves content item C107 to the personal trash folder of user 1. Upon completion of the execution of the trash command, CMS 150 displays a response containing the results of the execution of the trash command (as shown in FIG. 6B) and also updates the attribute data of FIG. 4B (as shown in FIG. 6C) and the personal trash folder data of user 1 and user 4 (as shown in FIGS. 6D and 6E respectively).

FIG. 6B depicts a sample response 630 displayed by CMS 150, containing the results of the execution of the trash command, in one embodiment. Response 630 provides the details of the content items (C104 and C107) that have been moved to trash folders. Columns 442, 444, 446, 448, 450, 452 and 454, and rows 488 and 494 of FIG. 6B correspond to the respective columns and rows of table 440 of FIG. 4B. Column 658 of user interface 630 indicates the original locations (i.e., locations prior to moving to trash folders) of the content items that have been moved to trash folders. As may be readily appreciated, the locations in column 658 correspond to respective locations in column 458 of FIG. 4B.

FIG. 6C depicts the status of the attribute data of FIG. 4B after the completion of execution of the trash command. As may be readily appreciated, the entries corresponding to content items C104 and C107 (i.e., rows 488 and 494 of FIG. 4B) that have been moved to personal trash folders of user 1 and user 4 are not present in FIG. 6C.

FIG. 6D depicts the personal trash folder data of user 1 (i.e., the user who has issued the search command). As may be readily appreciated, content item C107 has been moved to the personal trash folder of user 1 as "Author Trash Flag Value" is "false" for C107. User 1 or the administrator may be facilitated with various options such as restoring the content items back to the corresponding original locations, deleting the content items permanently from the physical locations of data store 120 etc. In an example embodiment, when a content item in the personal trash folder is selected, CMS 150 provides a list of options such as "restore", "delete" etc. User 1 or the administrator can restore the content item back to its original location by selecting the option "restore".

FIG. 6E depicts the personal trash folder data of user 4 (i.e., the author of content item C104). As may be readily appreciated, content item C104 has been moved to the personal trash folder of user 4 as "Author Trash Flag Value" is "true" for C104. User 4 or the administrator may be facilitated with various options such as restoring the content items back to the corresponding original locations, deleting the content items permanently from the physical locations of data store 120 etc. In an example embodiment, when a content item in the personal trash folder is selected, CMS 150 provides a list of options such as "restore", "delete" etc. User 4 or the administrator can restore the content item back to its original location by selecting the option "restore".

FIGS. 7A-7D together illustrate yet another example operation of a trash command on content items in storage systems. FIG. 7A depicts a query generated and displayed in query text 340 by CMS 150 based on the specifications made by user 1 through the user interfaces of FIGS. 3A and 3B from end user system 160. The query of FIG. 7A is shown containing portions 702, 704, 706, 708 and 710. Portions 702 and 706 correspond to the first and second attribute conditions respectively. Portion 710 depicts trash flag as being set. Portions 704 and 708 correspond to the logical operators.

When user 1 clicks on go button 345, CMS 150 receives the query of FIG. 7A and deems the query as a trash command after determining that trash flag 335 is set. Upon determining that a trash command is received, CMS 150 examines/parses the user management data in table 400 of FIG. 4A and determines that G1 is the corresponding user group of user 1. CMS 150 then examines the attribute data in table 440 of FIG. 4B and selects content items C102 and C105 (i.e., rows 484 and 490 of FIG. 4B respectively) as the content items having attributes matching the expression. CMS 150 then checks column 456 corresponding to rows 484 and 490 and determines that user 1 does not have the access privileges to trash content item C102 and has access privileges to trash content item C105 and accordingly removes content item C102 from the selected items. CMS 150 then examines the corresponding author trash flag value for content item C105 and determines that the author trash flag is set. As the corresponding author flag is set, CMS 150 moves content item C105 to the personal trash folder of user 3 (author of content item C105). As user 1 does not have the access privileges to trash content item C102, CMS 150 does not trash content item C102 though content C102 has attributes matching the expression. Upon completion of the execution of the trash command, CMS 150 displays a response containing the results of the execution of the trash command (as shown in FIG. 7B) and also updates the attribute data of FIG. 4B (as shown in FIG. 7C) and the personal trash folder data of user 3 (as shown in FIG. 7D).

FIG. 7B depicts a sample response 730 displayed by CMS 150, containing the results of the execution of the trash command, in one embodiment. Response 730 provides the details of the content item (C105) that has been moved to a trash folder and the details of the content item (C102) that has not been moved to any trash folder. Columns 442, 444, 446, 448, 450, 452, 454 and 458, and rows 484 and 490 of FIG. 7B correspond to the respective columns and rows of table 440 of FIG. 4B. Column 758 of user interface 730 indicates the original location (i.e., location prior to moving to trash folders) of the content item that has been moved to a trash folder. As may be readily appreciated, the location in column 758 correspond to respective locations in column 458 of FIG. 4B.

FIG. 7C depicts the status of the attribute data of FIG. 4B after the completion of the execution of the trash command. As may be readily appreciated, the entry corresponding to content item C105 (i.e., row 490 of FIG. 4B) that has been moved to the personal trash folder of user 3 is not present in FIG. 7C. Furthermore, it may be appreciated that the entry corresponding to content item C102 (i.e., row 484 of FIG. 4B) is present in FIG. 7C as C102 has not been trashed as user 1 does not have access privileges to trash content item C102.

FIG. 7D depicts the personal trash folder data of user 3 (i.e., the author of content item C105). As may be readily appreciated, content item C105 has been moved to the personal trash folder of user 3 as "Author Trash Flag Value"

is "true" content item 105. User 3 or the administrator may be facilitated with various options such as restoring the content items back to the corresponding original locations, deleting the content items permanently from the physical locations of data store 120 etc. In an example embodiment, when a content item in the personal trash folder is selected, CMS 150 provides a list of options such as "restore", "delete" etc. User 3 or the administrator can restore the content item back to its original location by selecting the option "restore".

It should be further appreciated that the features described above can be implemented in various embodiments as a desired combination of one or more of hardware, software, and firmware. The description is continued with respect to an embodiment in which various features are operative when the software instructions described above are executed.

6. Digital Processing System

Figure 8:
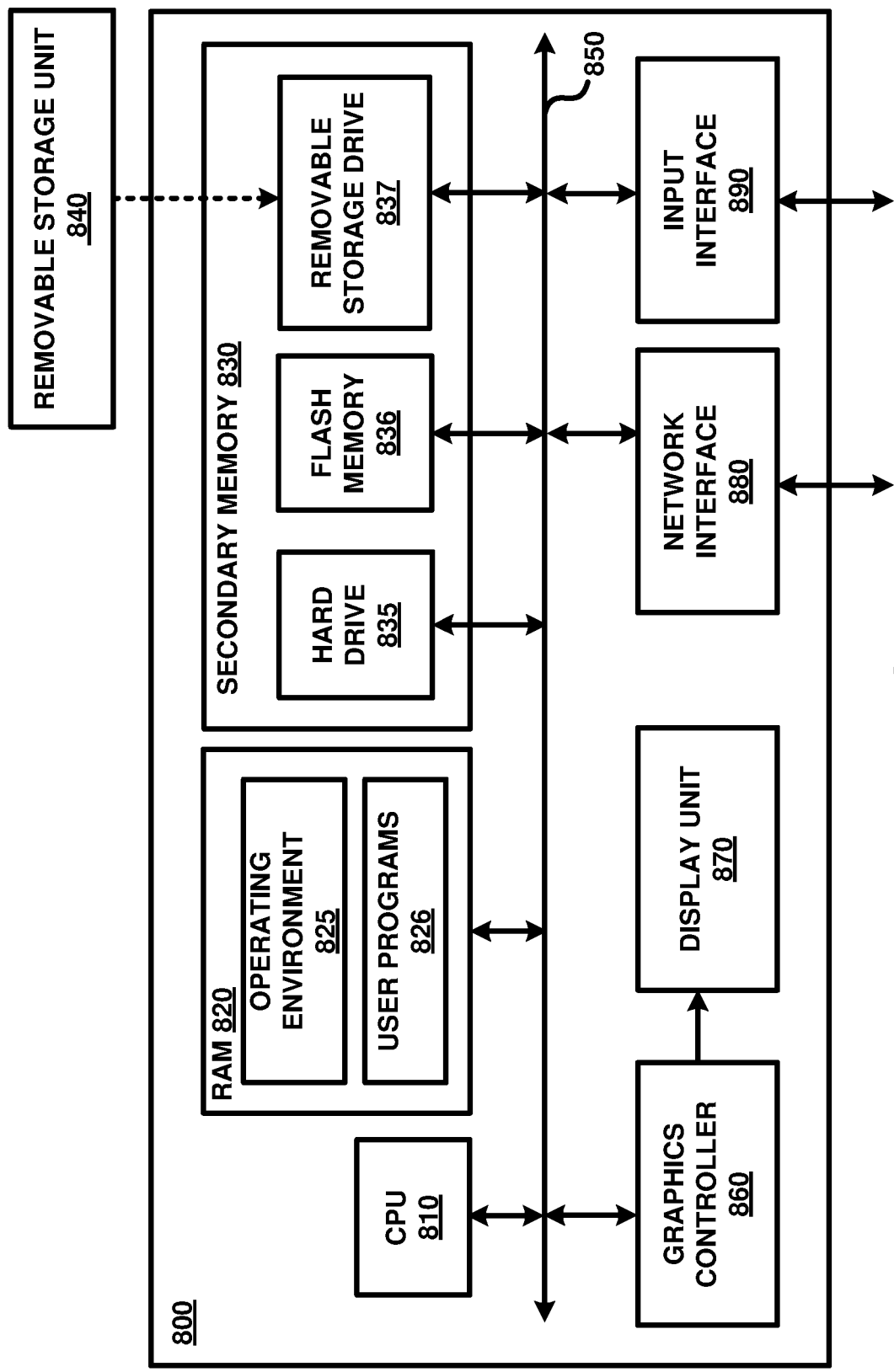
FIG. 8 is a block diagram illustrating the details of a digital processing system in which several aspects of the present disclosure are operative by execution of appropriate executable modules.

FIG. 8 is a block diagram illustrating the details of digital processing system 800 in which various aspects of the present disclosure are operative by execution of appropriate executable modules. Digital processing system 800 may correspond to each of content management system (CMS) 150 and end user systems 160A-160X.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or other user programs 826 (such as other applications, DBMS, etc.). In addition to shared environment 825, RAM 820 may contain other software programs such as device drivers, virtual machines, etc., which provide a (common) run time environment for execution of other/user programs.

Graphics controller 860 generates display signals (e.g., in RGB format) to display unit 870 based on data/instructions received from CPU 810. Display unit 870 contains a display screen to display the images defined by the display signals (for example, the portions of the user interfaces shown in FIGS. 3A-3B, 5B, 6B and 7B). Input interface 890 may correspond to a keyboard and a pointing device (e.g., touch-pad, mouse) and may be used to provide inputs. Network interface 880 provides connectivity to a network (e.g., using Internet Protocol), and may be used to communicate with other systems (of FIG. 1) connected to the network (110).

Secondary memory 830 may contain hard drive 835, flash memory 836, and removable storage drive 837. Secondary memory 830 may store the data (for example, content items, data of FIGS. 4A-4B, 5C-5D, 6C-6E, and 7C-7D, etc.) and software instructions (for example, for implementing the various features of the present disclosure described above), which enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

7. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A method for managing content items in a storage system, said method comprising:
   maintaining respective attribute instances associated with each content item of said content items, wherein each attribute instance comprises a name-value pair, with the name uniquely identifying the corresponding attribute and the value specifying a characteristic of the content item in relation to the identified attribute;
   receiving a trash command from a user, said trash command specifying an expression of a set of attribute conditions connected by logical operators, wherein each attribute condition specifies a condition required to be satisfied by a corresponding attribute;
   selecting a set of content items having attributes matching said expression,
   wherein said selecting comprises checking whether the attribute instances of each content item together satisfy said expression, wherein the content item is included in said set of content items only if attribute instances of the content item satisfy said expression,
   said set of content items being stored in corresponding logical locations on said storage system prior to receipt of said trash command; and
   moving said set of content items from respective logical locations on said storage system to a set of trash folders,
   wherein said selecting and moving are performed in response to receiving of said trash command specifying said expression without requiring any further user inputs after receipt of said trash command.

2. The method of claim 1, further comprising:
   receiving a trash flag capable of being set to a first value or a second value, wherein said trash command is deemed to be received only when said trash flag is set to said first value,
   and if said trash flag is set to said second value, sending for display said set of content items having attributes matching said expression.

3. The method of claim 1, wherein said storage system comprises a content management system and said logical locations comprise folders.

4. The method of claim 1, wherein said set of trash folders include a personal trash folder of said user and respective personal trash folders of authors of said set of content items,
   wherein an author flag is associated with each of said set of content items, wherein said author flag is capable of being set to a third value or a fourth value,
   wherein said moving moves each content item of said set of content items to said personal trash folder of said user if a corresponding author trash flag is set to said third value, and to personal trash folder of the author of the content item if the corresponding author trash flag is set to said fourth value.

5. The method of claim 1, wherein said moving moves a content item of said set of content items to said set of trash folders only if the access privileges of said user permit such moving.

6. The method of claim 1, further comprising:
   receiving a command to restore a first content item of said set of content items; and
   in response to said command, moving said first content item from a corresponding trash folder to corresponding logical location from which said first content item was moved from, on said storage system.

7. The method of claim 1, wherein each of said content item is a corresponding file of a plurality of files on a file system, wherein said trash command is received with respect to said plurality of files stored on said file system and a set of files of said plurality of files matching said expression are moved to said set of trash folders.

8. A non-transitory machine readable medium storing one or more sequences of instructions for managing content items in a storage system, wherein execution of said one or more instructions by one or more processors contained in a digital processing system causes the digital processing system to perform the actions of:
   maintaining respective attribute instances associated with each content item of said content items, wherein each attribute instance comprises a name-value pair, with the name uniquely identifying the corresponding attribute and the value specifying a characteristic of the content item in relation to the identified attribute;
   receiving a trash command from a user, said trash command specifying an expression of a set of attribute conditions connected by logical operators, wherein each attribute condition specifies a condition required to be satisfied by a corresponding attribute;
   selecting a set of content items having attributes matching said expression,
   wherein said selecting comprises checking whether the attribute instances of each content item together satisfy said expression, wherein the content item is included in said set of content items only if attribute instances of the content item satisfy said expression,
   said set of content items being stored in corresponding logical locations on said storage system prior to receipt of said trash command; and
   moving said set of content items from respective logical locations on said storage system to a set of trash folders,
   wherein said selecting and moving are performed in response to receiving of said trash command specifying said expression without requiring any further user inputs after receipt of said trash command.

9. The non-transitory machine readable medium of claim 8, further comprising one or more instructions for:
   receiving a trash flag capable of being set to a first value or a second value, wherein said trash command is deemed to be received only when said trash flag is set to said first value,
   and if said trash flag is set to said second value, sending for display said set of content items having attributes matching said expression.

10. The non-transitory machine readable medium of claim 8, wherein said storage system comprises a content management system and said logical locations comprise folders.

11. The non-transitory machine readable medium of claim 8, wherein said set of trash folders include a personal trash folder of said user and respective personal trash folders of authors of said set of content items, wherein an author flag is associated with each of said set of content items, wherein said author flag is capable of being set to a third value or a fourth value, wherein said moving moves each content item of said set of content items to said personal trash folder of said user if a corresponding author trash flag is set to said third value, and to personal trash folder of the author of the content item if the corresponding author trash flag is set to said fourth value.

12. The non-transitory machine readable medium of claim 8, wherein said moving moves a content item of said set of content items to said set of trash folders only if the access privileges of said user permit such moving.

13. The non-transitory machine readable medium of claim 8, further comprising one or more instructions for:
receiving a command to restore a first content item of said set of content items; and
in response to said command, moving said first content item from a corresponding trash folder to corresponding logical location from which said first content item was moved from, on said storage system.

14. The non-transitory machine readable medium of claim 8, wherein each of said content item is a corresponding file of a plurality of files on a file system, wherein said trash command is received with respect to said plurality of files stored on said file system and a set of files of said plurality of files matching said expression are moved to said set of trash folders.

15. A digital processing system for managing content items in a storage system, the digital processing system comprising:
a memory to store instructions;
one or more processors to execute the instructions stored in the memory to cause the digital processing system to perform the actions of:
maintaining respective attribute instances associated with each content item of said content items, wherein each attribute instance comprises a name-value pair, with the name uniquely identifying the corresponding attribute and the value specifying a characteristic of the content item in relation to the identified attribute;
receiving a trash command from a user, said trash command specifying an expression of a set of attribute conditions connected by logical operators, wherein each attribute condition specifies a condition required to be satisfied by a corresponding attribute;
selecting a set of content items having attributes matching said expression,
wherein said selecting comprises checking whether the attribute instances of each content item together satisfy said expression, wherein the content item is included in said set of content items only if attribute instances of the content item satisfy said expression,
said set of content items being stored in corresponding logical locations on said storage system prior to receipt of said trash command; and
moving said set of content items from respective logical locations on said storage system to a set of trash folders,
wherein said selecting and moving are performed in response to receiving of said trash command specifying said expression without requiring any further user inputs after receipt of said trash command.

16. The digital processing system of claim 15, further performing the actions of:
receiving a trash flag capable of being set to a first value or a second value, wherein said trash command is deemed to be received only when said trash flag is set to said first value,
and if said trash flag is set to said second value, sending for display said set of content items having attributes matching said expression.

17. The digital processing system of claim 15, wherein said storage system comprises a content management system and said logical locations comprise folders.

18. The digital processing system of claim 15, wherein said set of trash folders include a personal trash folder of said user and respective personal trash folders of authors of said set of content items,
wherein an author flag is associated with each of said set of content items, wherein said author flag is capable of being set to a third value or a fourth value,
wherein said moving moves each content item of said set of content items to said personal trash folder of said user if a corresponding author trash flag is set to said third value, and to personal trash folder of the author of the content item if the corresponding author trash flag is set to said fourth value.

19. The method of claim 15, further performing the actions of:
receiving a command to restore a first content item of said set of content items; and
in response to said command, moving said first content item from a corresponding trash folder to corresponding logical location from which said first content item was moved from, on said storage system.

20. The digital processing system of claim 15, wherein each of said content item is a corresponding file of a plurality of files on a file system, wherein said trash command is received with respect to said plurality of files stored on said file system and a set of files of said plurality of files matching said expression are moved to said set of trash folders.

\* \* \* \* \*

UNITED STATES PATENT AND TRADEMARK OFFICE
CERTIFICATE OF CORRECTION

PATENT NO. : 10,712,969 B2
APPLICATION NO. : 16/211267
DATED : July 14, 2020
INVENTOR(S) : Prasad et al.

Page 1 of 1

It is certified that error appears in the above-identified patent and that said Letters Patent is hereby corrected as shown below:

On the Title Page

On page 2, Column 1, item (56) under Other Publications, Line 5, delete "2016," and insert -- 2018, --, therefor.

In the Specification

In Column 1, Line 65, delete "FIG." and insert -- FIGS. --, therefor.

In the Claims

In Column 18, Line 37, in Claim 19, delete "method" and insert -- digital processing system --, therefor.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*